United States Patent Office 3,392,189
Patented July 9, 1968

3,392,189
METHOD FOR PREPARING METHACRYLONITRILE AND ACRYLONITRILE BY CATALYTIC AMMOXIDATION OF ISOBUTYLENE AND PROPYLENE
Jamal S. Eden, Akron, Ohio, assignor to The B. F. Goodrich Company, New York, N.Y., a corporation of Delaware
No Drawing. Filed Aug. 30, 1965, Ser. No. 483,796
13 Claims. (Cl. 260—465.3)

ABSTRACT OF THE DISCLOSURE

Isobutylene or propylene is reacted with ammonia and oxygen at an elevated temperature in the presence of a catalyst containing molybdenum oxide, tellurium oxide and an iron, nickel or cobalt phosphate catalyst to form methacrylonitrile or acrylonitrile.

---

This invention relates to a method of preparing acrylonitrile or methacrylonitrile by ammoxidation of monoolefinic hydrocarbons containing 3 to 4 carbon atoms at an elevated temperature, and relates more particularly to a method of preparing acrylonitrile or methacrylonitrile by passing vapors of propylene or isobutylene, ammonia and an oxygen containing gas at a temperature of from about 375° C. to about 500° C. over a catalyst comprising a mixture of a molybdenum oxide, tellurium oxide and a metal phosphate of a metal of the fourth period of Group VIII of the Periodic Table in a molar ratio of 100 $MoO_3$, 10–100 $TeO_2$, and 10–100 of the metal phosphate. The catalyst can also be designated as $Mo_{10}Te_{1-10}M_{2-20}P_{2-20}O_{39-120}$, wherein M is iron, nickel or cobalt with P being in the form of a phosphate i.e., each P atom is attached to 3 to 4 oxygen atoms.

Nitriles have been prepared by ammoxidation of hydrocarbons, especially from the normally gaseous hydrocarbons. However, prior catalysts and procedures for ammoxidizing propylene or isobutylene to acrylonitrile or methacrylonitrile have certain shortcomings. The catalysts either have a very short active life, or they convert only a portion of the hydrocarbon to the desired unsaturated nitrile per pass; they oxidize the hydrocarbon excessively to form high proportions of carbon monoxide or carbon dioxide or both or they are not sufficiently selective, so that the hydrocarbon molecule is attacked at both the olefinic unsaturation and at a methyl group and large amounts of HCN and acetonitrile are formed.

It is therefore unexpected to find a catalyst that will convert from over 50 to as high as 100% per pass of a monoolefin containing 3 to 4 carbon atoms to yield very high proportions of acyrlonitrile or methacrylonitrile. A further unexpected feature is the unusually long active life of the catalyst along with the concurrent production of acrylic acid in recoverable amounts.

THE REACTANTS

The essential reactants are propylene or isobutylene, ammonia and an oxygen containing gas, which can be pure oxygen, oxygen enriched air or air without additional oxygen. For reasons of economy, air is the preferred oxygen containing reactant.

The addition of steam into the reactor along with the monoolefin, ammonia and an oxygen containing gas is desirable but not absolutely essential. The function of steam is not clear, but it does seem to reduce the amount of carbon monoxide and dioxide in the effluent gases.

Other diluent gases can be used. Surprisingly, saturated hydrocarbons such as propane or butane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to provide the requisite amount of a molybdenum salt, a tellurium salt and a Group VIII metal salt in water. Add the requisite amount of phosphoric acid to the metal salt solution. Add the tellurium salt solution to the molybdenum salt solution and then add the metal salt-phosphoric acid mixture to the molybdenum-tellurium salt mixture. The catalyst is then dried and baked at 400° C. for about 16 hours.

Supported catalysts can be prepared by adding an aqueous slurry of the support to the aqueous solution of catalyst or the aqueous catalyst ingredients can be added to the slurry of the support.

Alternately a slurry of the catalyst ingredients can be prepared in water, then dried and baked. For supported catalysts the aqueous slurry of the catalyst ingredients can be added to an aqueous suspension of the support or vice versa, and then dried and baked.

A third method is to blend the dry ingredients and then mix them thoroughly. The main difficulty is to obtain thorough blending and uniform particle size.

A specific procedure for making the catalysts is as follows:

In this procedure the ingredients are precipitated on blending.

(a) Dissolve 105.96 g. of ammonium molybdate in 130 ml. of water.

(b) Dissolve 31.922 g. $TeO_2$ in concentrated HCl and filter if necessary.

Add the tellurium salt solution to the ammonium molybdate solution. A precipitate forms.

(c) Dissolve 54.064 g. of $FeCl_3 \cdot 6H_2O$ in water and add 23.1 g. of 85% $H_3PO_4$. Add this mixture slowly to the precipitated ammonium molybdate-$TeO_2$ mixture. Dry the mixture on a steam bath and bake for 16 hours at 400° C. Thereafter the catalyst is ground to the desired mesh size and sieved. For supported catalysts an aqueous slurry of the support can be added to the catalyst ingredients or vice versa prior to drying and baking.

Among the suitable supports are silica, silica containing materials such as diatomaceous earth and kieselguhr, silicon carbide, clay, aluminum oxides and even carbon, although the latter tends to be consumed during the reaction.

If the catalyst is to be supported the aqueous solution of ingredients can be added to an aqueous slurry of the support of vice versa, prior to drying. The procedure after drying is the same as that already described. Thus, to the aqueous catalyst ingredients 240 g. of a 30–35% aqueous colloidal dispersion of microspheroidal silica (Ludox H.S.) are added slowly with stirring. Stirring is continued for about ½ hour prior to drying. Another procedure is to add the mixture described under (c) to the Ludox and then add the requisite amount of $TeO_2$ and $MoO_3$ as a slurry. Also the ingredients can be added to the Ludox individually if desired.

Another method is to grind $MoO_3$, $TeO_2$ and a metal phosphate to the proper particle size and then thoroughly mix the dry powders. The mixture can be added to an aqueous slurry of a support or vice versa and thereafter dried and baked.

For fixed bed systems a 10–18 mesh (U.S. Sieve) size is satisfactory. For fluid bed systems the catalyst particle size should be 80–325 mesh (U.S. Sieve).

The exact chemical structure of the catalysts made by the above procedures is not known, but catalysts with molar ratios of 100 Mo, 10–100 Te and 10–100 of a Group VIII metal phosphate can be used. The catalyst contains chemically bound oxygen so that the generic formula can be written as $MoO_3$ 100 $TeO_2$ 10–100 $M_2P_2O_7$ or other Group VIII metal phosphates 10–100.

The phosphate can be a $PO_4$ radical, pyrophosphate or a polyphosphate, for example, nickel orthophosphate, ferric phosphate, ferrous phosphate, ferric pyrophosphate, nickel pyrophosphate, cobalt phosphate, and the like.

Useful catalysts are ones having ratios of about 100 $MoO_3$, 33.33 $TeO_2$ and 66.66 $Co_2P_2O_7$; 100 $MoO_3$, 33.33 $TeO_2$ and 66.66 $Ni_2P_2O_7$; 100 $MoO_3$, 33.33 $TeO_2$ and 33.33 $FePO_4$; and 100 $MoO_3$, 33.33 $TeO_2$ and 66.6 $Fe_4(P_2O_7)_3$ because they give high yields of desired products and the preferred support is silica, because of its low cost and good fluidizing characteristics.

REACTION CONDITIONS

The reaction can be carried out in either a fixed or fluidized catalyst bed.

The reaction temperature can range from about 375 to 500° C. but the preferred range is from about 400 to about 480° C. Below about 375° C. the conversion of monoolefin per pass and yield of unsaturated nitrile is lower than desirable. Usually, a longer contact time is needed at lower temperatures to obtain the yields of unsaturated nitriles obtainable at temperatures in the optimum range.

Above 480° C. some of the acrylonitrile appears to be oxidized to carbon oxides, acetonitrile and HCN. This is much more apparent at 500° C.

The mol ratio of oxygen to propylene should be from 1.5 to 1 and preferably from 2 to 1 to 4 to 1 for good conversion and yields, but ratios with some excess oxygen, 33 to 100% is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide 33 to 66% excess of oxygen. This range provides the largest proportion of nitrile, under given reaction conditions. Also, since care is needed to avoid an explosive mixture the limiting of air aids in that direction. The mol ratio of ammonia to propylene can range from about 0.5 to 1 to about 1.75 to 1. The preferred ratio is 0.75 to 1.5 of ammonia per mol of propylene.

The molar ratio of steam to propylene can range from 0 to about 7, but best results are obtained with molar ratios of about 3 to 5 per mol of propylene and for this reason are preferred.

The contact time can vary considerably in the range of about 2 to 70 seconds. Best results are obtained in a range of about 8 to 54 seconds and this range is preferred The particle size of catalyst for fixed bed and fluid bed systems has already been described.

The reaction can be run at atmospheric pressure, in a partial vacuum or under induced pressure up to 50–100 p.s.i. Atmospheric pressure is preferred for fixed bed systems and a pressure of 1 to 50 p.s.i. for fluid bed reactions. Care is needed to operate at a pressure which is below the dew point pressure of the acrylonitrile or methacrylonitrile at the reaction temperature.

The example is intended to illustrate the invention but not to limit it.

Example I

The catalyst in this example was prepared by the solution procedure described above. It contained a molar ratio of 75 $MoO_3$, 25 $TeO_2$ and 25 $FePO_4$ and was unsupported. A high silica glass (Vycor) tube 12 inches long and 30 mm. in outer diameter was filled with 170 ml. of the catalyst. Three external electrically operated heating coils were wound on the reactor. One of the coils extended along the entire length of the reactor and each of the remaining coils extended about one half the length of the reactor. Outlet vapors were passed through a short water cooled condenser. Uncondensed gases were passed through a gas chromatograph (Perkin-Elmer Model 154D) and analyzed continuously. The liquid condenser was weighed and then analyzed for its acrylonitrile content in the gas chromatograph.

Steam at a temperature of 200–250° C. was first passed into this fixed bed reactor. Then propylene and air were fed separately into the stream of water vapor. The mixture passed through a pre-heater and entered the reactor at a temperature of 200–250° C. The reactor was preheated to about 300° C. before the gas feed was begun. The molar ratio of the feed was 3 mols of oxygen (supplied as air) per mol of propylene, 4.36 mols of water per mol of propylene. The mols of ammonia per mol of propylene, the temperature in the reactor during the run and the cold contact time are set forth in the table below. No acetonitrile could be detected in the effluent gases.

| Run | Ammonia, mols | Contact Time, seconds | Temperature, ° C. | Mol Percent Conversion | Mol Percent yield | |
|---|---|---|---|---|---|---|
| | | | | | Acrylic Acid | Acrylonitrile |
| 1 | 0.86 | 21.5 | 410 | 100 | 13.2 | 53.6 |
| 2 | 1.14 | 21.0 | 422 | 100 | 10.5 | 57.6 |
| 3 | 1.29 | 22.5 | 415 | 100 | 4.5 | 74.4 |

Example II

A catalyst containing a molar ratio of 75 $MoO_3$, 25 $TeO_2$, 25 $Ni_2P_2O_7$ was prepared by the solution procedure described above. This catalyst was used as described in Example I with 1.07 mols of ammonia per mol of propylene, at a temperature of 455° C. and a cold contact time of 43 seconds. The conversion of propylene was 100% and the mol percent yield of acrylonitrile was 59.93 with 11.04% acrylic acid. In another run with 0.86 mol of ammonia and at 450° C., the conversion of propylene was 100% and the mol percent yield of acrylonitrile was 33.08 while the yield of acrylic acid was 30.04%.

Example III

A catalyst containing a molar ratio of 75 $MoO_3$, 25 $TeO_2$, 25 $Co_2P_2O_7$ was prepared in accordance with the solution procedure described above. This catalyst was used as described in Example I with 1.29 mols of ammonia per mol of propylene at 455° C. and at a cold contact time of 43 seconds. The mol percent conversion of propylene was 99% and a mol percent yield of acrylonitrile based on the propylene converted was 58.53 with 9.92% acrylic acid. In another run with 0.86 mol of ammonia at 450° C. the conversion was 98.55% and the yields were 34.56% acrylonitrile and 23.16% acrylic acid.

The hydrocarbons which are ammoxidized according to this invention have the formula

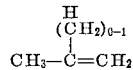

The desired end products result from the ammoxidation of only one methyl group on the hydrocarbon molecule, while the terminal $CH_2{=}C{<}$ group remains intact.

The nitriles produced can be defined as alpha, beta monoolefinically unsaturated nitriles having 3 to 4 carbon atoms and a terminal $CH_2{=}C{<}$ group or they can be defined by the general formula

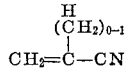

I claim:
1. A method of producing compounds of the formula

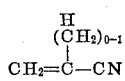

comprising, passing a mixture of a molecular oxygen containing gas in a quantity sufficient to provide a molar ratio of from about 1.5 to about 4 mols of oxygen per mol of a hydrocarbon of the formula

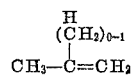

one mol of said hydrocarbon, and from about 0.5 to 1.75 mols of ammonia per mol of said hydrocarbon, over a catalyst consisting essentially of a mixture of molybdenum oxide, tellurium oxide and an iron, nickel or cobalt phosphate in a molar ratio of 100 molybdenum oxide, 10–100 $TeO_2$ and 10–100 of iron, nickel or cobalt phosphate at a temperature of from about 300 to about 525° C. at a contact time of from about 2 to 70 seconds.

2. The method of claim 1 in which the hydrocarbon is propylene and the temperature ranges from about 350 to about 480° C. to thereby produce acrylonitrile.

3. A method of preparing acrylonitrile comprising passing a mixture containing a molar ratio of one mol of propylene, sufficient molecular oxygen containing gas to provide from about 2 to about 4 mols of oxygen per mol of propylene, from up to about 7 mols of water vapor per mol of propylene and from about 1 to about 1.5 mols of ammonia per mol of propylene over a catalyst consisting essentially of a mixture of $MoO_3$, $TeO_2$ and an iron, nickel or cobalt phosphate in a molar ratio of 100 $MoO_3$, 10–100 $TeO_2$ and 10–100 of the iron, nickel or cobalt phosphate at a temperature of from about 400 to about 480° C. with a contact time of 8 to 54 seconds.

4. The method of claim 3 in which the catalyst contains a major proportion of $MoO_3$ and lesser proportions of $TeO_2$ and $FePO_4$.

5. The method of claim 3 in which the catalyst contains a major proportion of $MoO_3$ and lesser proportions of $TeO_2$ and $(Fe)_4(P_2O_7)_3$.

6. The method of claim 3 in which the catalyst contains a major proportion of $MoO_3$ and lesser proportions of $TeO_2$ and $Ni_2P_2O_7$.

7. The method of claim 3 in which the catalyst contains a major proportion of $MoO_3$ and lesser proportions of $TeO_2$ and $Co_2P_2O_7$.

8. A method of preparing acrylonitrile comprising passing a mixture of about 3 mols of oxygen supplied as air, about 4 mols of water vapor and about 1.25–1.3 mols of ammonia per mol of propylene through a bed of a catalyst consisting essentially of a mixture of $MoO_3$, $TeO_2$ and an iron, nickel or cobalt phosphate in a molar ratio of about 100 $MoO_3$, 33.3 $TeO_2$ and 66.6 of an iron, nickel or cobalt phosphate at a temperature of about 400–450° C. and a cold contact time of about 20 seconds.

9. The method of claim 4 in which the catalyst has a molar ratio of about 75 $MoO_3$, about 25 $TeO_2$ and about 25 $FePO_4$.

10. The method of claim 1 in which the catalyst is in a fixed bed.

11. The method of claim 1 in which the catalyst is impregnated on a silicic support.

12. A method of preparing methacrylonitrile comprising passing a mixture containing a molar ratio of one mole of isobutylene, a molecular oxygen containing gas in a quantity sufficient to provide from about 2 to about 4 mols of oxygen per mol of isobutylene, up to about 7 mols of water vapor and from 1 to 1.75 mols of ammonia per mol of isobutylene, through a catalyst consisting essentially of a mixture of $MoO_3$, $TeO_2$ and an iron, nickel or cobalt phosphate in a molar ratio of 100 $MoO_3$, 10–100 $TeO_2$ and 10–100 of iron, nickel or cobalt phosphate at a temperature of from about 400–500° C. and a contact time of from about 2 to about 70 seconds.

13. A method of preparing methacrylonitrile comprising passing a mixture having a molar ratio of 3 mols of oxygen supplied as air, 3–4 mols of water vapor and about 1.25–1.3 mols of ammonia per mol of isobutylene, through a catalyst consisting essentially of a mixture of $MoO_3$, $TeO_2$ and $FePO_4$ in a molar ratio of about 75 $MoO_3$, 25 $TeO_2$ and 25 $FePO_4$ at a temperature of 400–480° C. and a cold contact time of 20 to 25 seconds.

References Cited
UNITED STATES PATENTS

| | | | |
|---|---|---|---|
| 3,164,626 | 1/1965 | Minekawa et al. | 260—465.3 |
| 3,200,141 | 8/1965 | Milberger | 260—465.3 |
| 3,226,421 | 12/1965 | Giordano et al. | 260—465.3 |

JOSEPH P. BRUST, *Primary Examiner.*